(12) United States Patent
Mohan Raj et al.

(10) Patent No.: US 11,974,134 B2
(45) Date of Patent: Apr. 30, 2024

(54) METHODS, SYSTEMS, AND COMPUTER READABLE MEDIA FOR VALIDATING SUBSCRIBER ENTITIES AGAINST SPOOFING ATTACKS IN A COMMUNICATIONS NETWORK

(71) Applicant: Oracle International Corporation, Redwood Shores, CA (US)

(72) Inventors: John Nirmal Mohan Raj, Bangalore (IN); Yesh Goel, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 203 days.

(21) Appl. No.: 17/587,669

(22) Filed: Jan. 28, 2022

(65) Prior Publication Data
US 2023/0247430 A1     Aug. 3, 2023

(51) Int. Cl.
*G06F 21/00*     (2013.01)
*H04W 12/06*     (2021.01)
(Continued)

(52) U.S. Cl.
CPC ......... *H04W 12/122* (2021.01); *H04W 12/06* (2013.01); *H04W 12/72* (2021.01); *H04W 84/042* (2013.01)

(58) Field of Classification Search
CPC ... H04W 12/122; H04W 12/06; H04W 12/72; H04W 84/042; H04W 12/12
See application file for complete search history.

(56) References Cited

U.S. PATENT DOCUMENTS 10,306,459 B1   5/2019   Patil et al.
10,616,200 B2   4/2020   Kumar et al.
(Continued)

FOREIGN PATENT DOCUMENTS

WO   WO 2019158028 A1   8/2019
WO   WO 2020174121 A1   9/2020

OTHER PUBLICATIONS

"3rd Generation Partnership Project; Technical Specification Group Core Network and Terminals; 5G System; Network Function Repository Services; Stage 3 (Release 17)," 3GPP TS 29.510, V17.4.0 pp. 1-284 (Dec. 2021).

(Continued)

*Primary Examiner* — Kendall Dolly
(74) *Attorney, Agent, or Firm* — Jenkins, Taylor & Hunt, P.A.

(57) ABSTRACT

Methods, systems, and computer readable media for validating subscriber entities against spoofing attacks in a communications network are disclosed. One method includes receiving, by a proxy element, a subscriber authentication request message that is sent from an access and mobility management function (AMF) and is directed to a unified data management (UDM) function in a home network, creating, by the proxy element, a record entry including a subscriber identifier and a public land mobile network (PLMN) identifier contained in the subscriber authentication request message, wherein the record entry is stored in an authentication registry database prior to forwarding the subscriber authentication request message to the UDM function. The method further includes receiving, by the proxy element, a subsequent update context request message from the AMF, updating the record entry to include an AMF identifier if the subscriber identifier and the PLMN identifier in the subsequent update context request message respectively match the subscriber identifier and the PLMN iden- (Continued)

tifier in the record entry, and rejecting the subsequent update context request message if the subscriber identifier and the PLMN identifier in the subsequent update context request message fail to match the subscriber identifier and PLMN identifier in the record entry.

20 Claims, 14 Drawing Sheets

(51) Int. Cl.
*H04W 12/122* (2021.01)
*H04W 12/72* (2021.01)
*H04W 84/04* (2009.01)

(56) References Cited

U.S. PATENT DOCUMENTS

| | | | | |
|---|---|---|---|---|
| 11,553,342 | B2* | 1/2023 | Mahalank | H04L 67/141 |
| 11,818,570 | B2 | 11/2023 | Rajput et al. | |
| 2012/0110637 | A1 | 5/2012 | Holtmanns et al. | |
| 2020/0275279 | A1* | 8/2020 | Tangudu | H04W 12/068 |
| 2020/0344604 | A1* | 10/2020 | He | H04W 12/088 |
| 2020/0359218 | A1 | 11/2020 | Lee et al. | |
| 2021/0264299 | A1* | 8/2021 | Tomoda | G06N 20/00 |
| 2022/0124079 | A1 | 4/2022 | Patil et al. | |
| 2022/0124479 | A1* | 4/2022 | Iddya | H04W 8/06 |
| 2022/0386120 | A1* | 12/2022 | Kim | H04W 48/08 |
| 2023/0020994 | A1* | 1/2023 | Kunz | H04W 48/20 |
| 2023/0109272 | A1* | 4/2023 | Ryu | H04L 63/0892 370/329 |

OTHER PUBLICATIONS

"3rd Generation Partnership Project; Technical Specification Group Core Network and Terminals; 5G System; Unified Data Management Services; Stage 3 (Release 17)," 3GPP TS. 29.503, V17.5.0, pp. 1-466 (Dec. 2021).

"3rd Generation Partnership Project; Technical Specification Group Core Network and Terminals; 5G System; Authentication Server Services; Stage 3 (Release 17)," 3GPP TS. 29.509, V17.4.0 pp. 1-72 (Dec. 2021).

Notice of Allowance for U.S. Appl. No. 17/123,038 (dated Jun. 23, 2023).

Interview Summary for U.S. Appl. No. 17/123,038 (dated May 30, 2023).

Final Office Action for U.S. Appl. No. 17/123,038 (dated Mar. 9, 2023).

Non-Final Office Action for U.S. Appl. No. 17/123,038 (dated Sep. 30, 2022).

* cited by examiner

METHODS, SYSTEMS, AND COMPUTER READABLE MEDIA FOR VALIDATING SUBSCRIBER ENTITIES AGAINST SPOOFING ATTACKS IN A COMMUNICATIONS NETWORK

TECHNICAL FIELD

The subject matter described herein relates to the authentication and validation of subscribers in fifth generation (5G) communications networks. More particularly, the subject matter described herein relates to methods, systems, and computer readable media for validating subscriber entities against spoofing attacks in a communications network.

BACKGROUND

In telecommunications networks, a service endpoint is an address on a network node that uniquely identifies an entity that provides service to service consumers. The service endpoint can include an Internet protocol (IP) address or a combination of IP address and transport layer port number, which is also referred to as an IP endpoint.

In fifth generation (5G) telecommunications networks, the network node that provides service is referred to as a producer network function (NF). A network node that consumes services is referred to as a consumer NF. A network function can be both a producer NF and a consumer NF depending on whether it is consuming or providing service.

A given producer NF may have many service endpoints. Producer NFs register with a network function repository function (NRF). The NRF maintains an NF profile of available NF instances and their supported services. Consumer NFs can subscribe to receive information about producer NF instances that have registered with the NRF. Once registered, NF instances in the 5G network may establish sessions with one or more network exposure functions (NEFs). Notably, the NEF is a Third Generation Partnership Project (3GPP) network function that provides a means to securely expose the services and capabilities provided by producer network functions servicing the network.

At present, home PLMNs and other networks are encountering significant security issues. For example, in scenarios where mobile subscribers are roaming into foreign PLMNs, home PLMNs may be susceptible to spoofing attacks by malicious actors. For example, after the subscriber authentication mechanisms defined by 3GPP Technical Specifications 29.503 and 29.509 are executed, a user equipment may need to update its location and/or context (e.g., via a UE_CM request message). In particular, when the update context signaling occurs, there may be a situation where the identification information associated with the roaming mobile subscriber's user equipment can be spoofed by a malicious actor (e.g., a spoofing entity can send one or more fraudulent UE location update messages). Moreover, there is no procedure or mechanism that is presently performed at the AUSF and/or UDM in the home network that is able to identify and remedy such a spoofing attack.

Accordingly, there exists a need for improved methods and systems for validating subscriber entities against spoofing attacks in a communications network.

SUMMARY

Methods, systems, and computer readable media for validating subscriber entities against spoofing attacks in a communications network are disclosed. One method includes One method includes receiving, by a proxy element, a subscriber authentication request message that is sent from an access and mobility management function (AMF) and is directed to a unified data management (UDM) function in a home network, creating, by the proxy element, a record entry including a subscriber identifier and a public land mobile network (PLMN) identifier contained in the subscriber authentication request message, wherein the record entry is stored in an authentication registry database prior to forwarding the subscriber authentication request message to the UDM function. The method further includes receiving, by the proxy element, a subsequent update context request message from the AMF, updating the record entry to include an AMF identifier if the subscriber identifier and the PLMN identifier in the subsequent update context request message respectively match the subscriber identifier and the PLMN identifier in the record entry, and rejecting the subsequent update context request message if the subscriber identifier and the PLMN identifier in the subsequent update context request message fail to match the subscriber identifier and PLMN identifier in the record entry.

According to another aspect of the method described herein, resetting an authentication flag to zero after forwarding the subscriber authentication response message to the AMF.

According to another aspect of the method described herein, forwarding the update context request message to the UDM and restarting the record expiry timer.

According to another aspect of the method described herein, designating the subsequent update context request message as a suspicious message in response to rejecting the subsequent update context request message.

According to another aspect of the method described herein, forwarding the suspicious message to an analytics platform for message analysis.

According to another aspect of the method described herein, the proxy element is a security edge protection proxy (SEPP) or a service communication proxy (SCP).

According to another aspect of the method described herein, initiating a record expiry timer in response to receiving a subscriber authentication response message that includes the subscriber identifier and the PLMN identifier from the UDM.

According to another aspect of the disclosed subject matter described herein, one system for validating subscriber entities against spoofing attacks in a communications network includes a proxy element including at least one processor and a memory, and a spoofing attack prevention manager that is implemented by the at least one processor configured for receiving a subscriber authentication request message that is sent from an access and mobility management function (AMF) and is directed to a unified data management (UDM) function in a home network, creating a record entry including a subscriber identifier and a public land mobile network (PLMN) identifier contained in the subscriber authentication request message, wherein the record entry is stored in an authentication registry database prior to forwarding the subscriber authentication request message to the UDM function, receiving a subsequent update context request message from the AMF, updating the record entry to include an AMF identifier if the subscriber identifier and the PLMN identifier in the subsequent update context request message respectively match the subscriber identifier and the PLMN identifier in the record entry, and rejecting the subsequent update context request message if the subscriber identifier and the PLMN identifier in the subsequent update context request message fail to match the subscriber identifier and PLMN identifier in the record entry.

The subject matter described herein may be implemented in hardware, software, firmware, or any combination thereof. As such, the terms "function" "node" or "module" as used herein refer to hardware, which may also include software and/or firmware components, for implementing the feature being described. In one example implementation, the subject matter described herein may be implemented using one or more computer readable media having stored thereon computer executable instructions that when executed by the processor of a computer control the computer to perform steps. Example computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for validating mobile subscriber entities against spoofing attacks in a communications network. In particular, the disclosed subject matter includes methods and systems that mitigate and/or prevent spoofing attack scenarios by enabling appropriate preventive and remedial actions at a proxy device, such as an edge gateway (e.g., Security edge protection proxy (SEPP)) for roaming mobile subscribers or a service communication proxy (SCP) for mobile subscribers operating in a home network. Reference will now be made in detail to various embodiments of the subject matter described herein, examples of which are illustrated in the accompanying drawings. Wherever possible, the same reference numbers will be used throughout the drawings to refer to the same or like parts.

Figure 1:
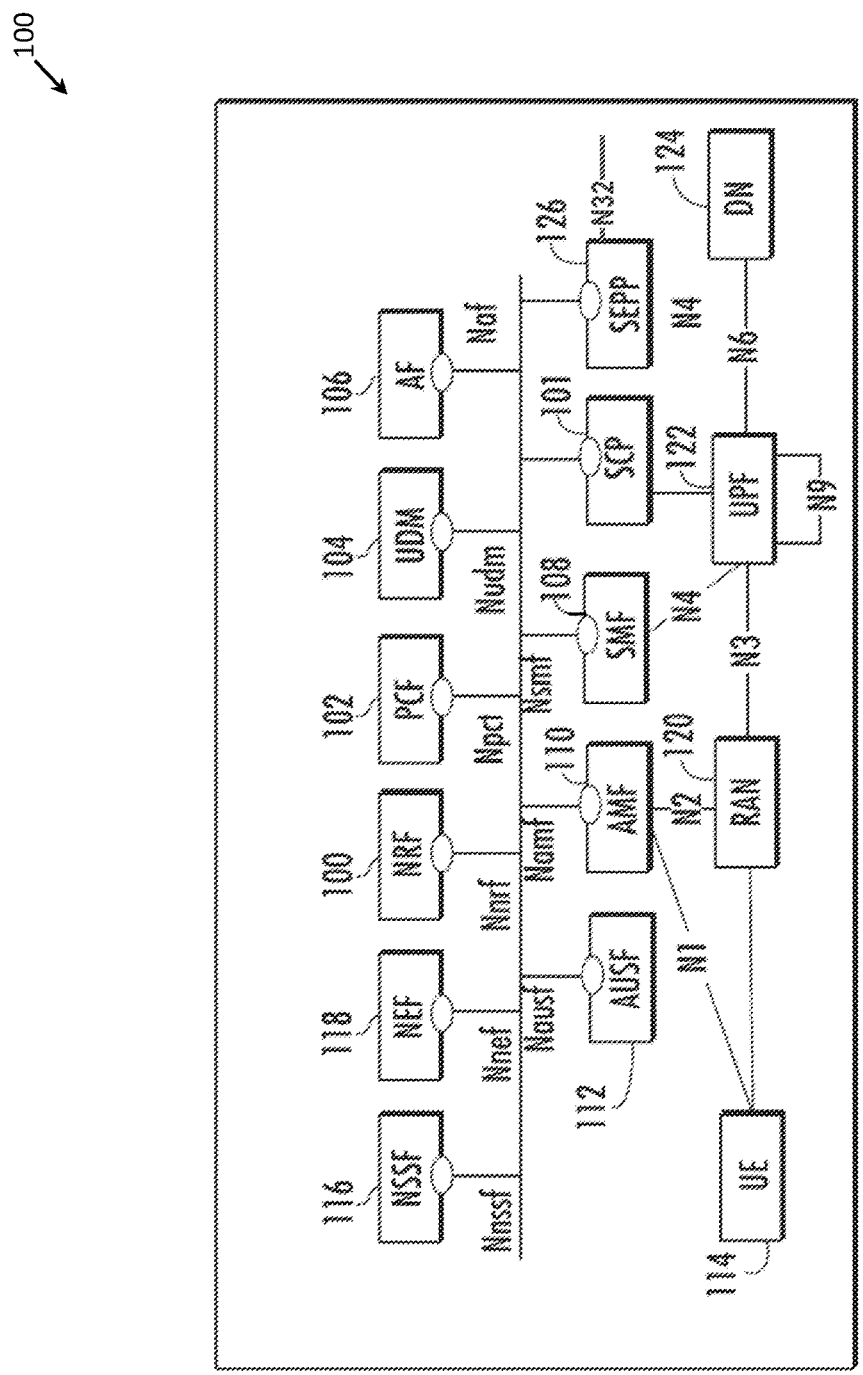
FIG. 1 is a network diagram illustrating an example fifth generation (5G) network architecture.

FIG. 1 is a block diagram illustrating an example 5G system network architecture, e.g., a home 5G core (5GC) network. The architecture in FIG. 1 includes an NRF 100 and an SCP 101, which may be located in the same home public land mobile network (PLMN). As described above, NRF 100 may maintain profiles of available producer NF service instances and their supported services and allow consumer NFs or SCPs to subscribe to and be notified of the registration of new/updated NF service instances. SCP 101 may also support service discovery and selection of NF instances. SCP 101 may perform load balancing of connections between consumer and producer NFs. In addition, using the methodologies described herein, SCP 101 may perform preferred NF location based selection and routing.

NRF 100 is a repository for NF or service profiles of NF instances. In order to communicate with a NF instance, a consumer NF or an SCP must obtain the NF service profile or the NF instance from NRF 100. The NF or service profile is a JavaScript object notation (JSON) data structure defined in 3GPP Technical Specification (TS) 29.510. The NF or service profile definition includes at least one of a fully qualified domain name (FQDN), an Internet protocol (IP) version 4 (IPv4) address, or an IP version 6 (IPv6) address. In FIG. 1, any of the nodes (other than NRF 100) can be either consumer NFs or producer NFs, depending on whether they are requesting or providing services. In the illustrated example, the nodes include a policy control function (PCF) 102 that performs policy related operations in a network, a unified data management (UDM) function 104 that manages user data, and an application function (AF) 106 that provides application services. The nodes illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user devices, such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects UE 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

Security edge protection proxy (SEPP) 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN. In some embodiments, the SEPP is an gateway device positioned on the edge of a network.

SEPP 126 may utilize an N32-c interface and an N32-f interface. An N32-c interface is a control plane interface between two SEPPs usable for performing an initial handshake (e.g., a TLS handshake) and negotiating various parameters for an N32-f interface connection and related message forwarding. An N32-f interface is a forwarding interface between two SEPPs usable for forwarding various communications (e.g., 5GC requests) between a consumer NF and a producer NF after applying application level security protection.

Figure 2:
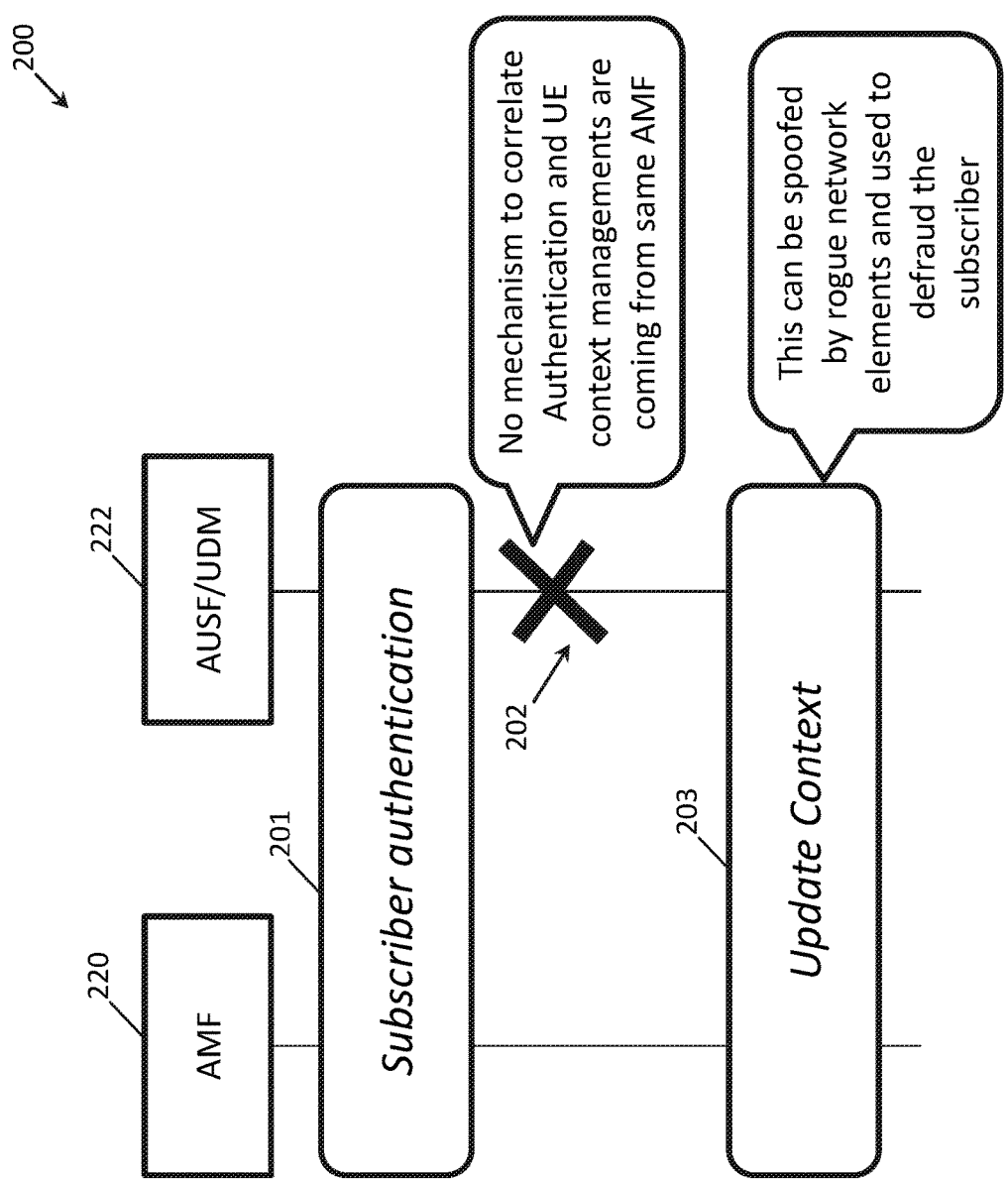
FIG. 2 is a signaling diagram illustrating an exemplary network system that is susceptible to current spoofing attacks.

FIG. 2 is a signaling diagram illustrating a problematic spoof attack scenario that can occur in a communications network. For example, a mobile subscriber (not shown) may either roam into a visited PLMN or may be located in a home PLMN. In the roaming scenario, the roaming user equipment (UE) will initiate a registration process with an AMF 220, which in turn will be triggered to authenticate the roaming subscriber. In this example depicted in FIG. 2, AMF 220 can be an AMF located in a visited network. Specifically, AMF 220 conducts a mobile subscriber authentication procedure 201 (e.g., UE_Auth and UE_Reg as defined by 3GPP TS 29.503 and 3GPP TS 29.509) with the AUSF/UDM 222, which is located in the UE's home PLMN. After the subscriber authentication of the UE is conducted, the UE may need to subsequently update its location and/or context (e.g., via a UE_CM request message). However, there is presently no mechanism that correlates the original subscriber authentication request messaging with the UE context management messages that are received from the same (visited) AMF 220 (see, e.g., x-shaped element 202). Consequently, when the update context (UE_CM) signaling 203 occurs, there may be a situation where the subscriber's UE identity (e.g., identifier associated with the roaming mobile user equipment) can be spoofed or imitated by a malicious actor (e.g., a spoofing entity). For example, a spoofing entity can send one or more fraudulent UE location update messages to the AMF 220, which in turn may forward the spoofed UE location update messages to AUSF/UDM 222. Specifically, there is no procedure or mechanism that is currently performed at the AUSF or UDM that is able to identify and/or prevent such a spoofing attack.

As indicated above, FIG. 2 depicts and describes AMF 220 as a visited AMF belonging to a visited network. However, it is understood that similar challenges exist when AMF 220 is a AMF located in the home PLMN. Notably, if a UE (of a non-roaming mobile subscriber) in the home network needs to update its location, there is a possible scenario where the UE's identity could be spoofed. However, similar to the scenario described above, there is presently no mechanism or procedure at the AUSF/UDM that correlates the original subscriber authentication request messaging with the UE context management messages that are received from the same AMF. Accordingly, there is nothing that is currently performed at the AUSF or UDM that is able to identify and/or prevent a spoofing attack involving a AMF in the described scenario.

In some embodiments, the disclosed solution can be implemented as one or more algorithms, software programs, processes, etc. that are provisioned as a spoof attack prevention manager (SAPM) on a proxy element. Notably, the proxy element or device can be any proxy component, such as an SEPP gateway (e.g., for roaming subscribers in a visited network) or an SCP element (e.g., for non-roaming subscribers in a home network). Notably, the operation of the SAPM on the proxy element is largely the same, but the use case and network location differ. For example, operation of the SAPM at an SEPP implements spoofing attack prevention in a visited network or home network when a subscriber UE is roaming. Similarly, operation of the SAPM at an SCP implements spoofing attack prevention in a home network when a subscriber UE is not roaming (i.e., subscriber UE is only operating in the home network). Examples of implementing the SAPM at the SEPP are described below and illustrated in FIGS. 3-7, while operation at a home network SCP is described further below and illustrated in FIGS. 8-11.

Figure 3:
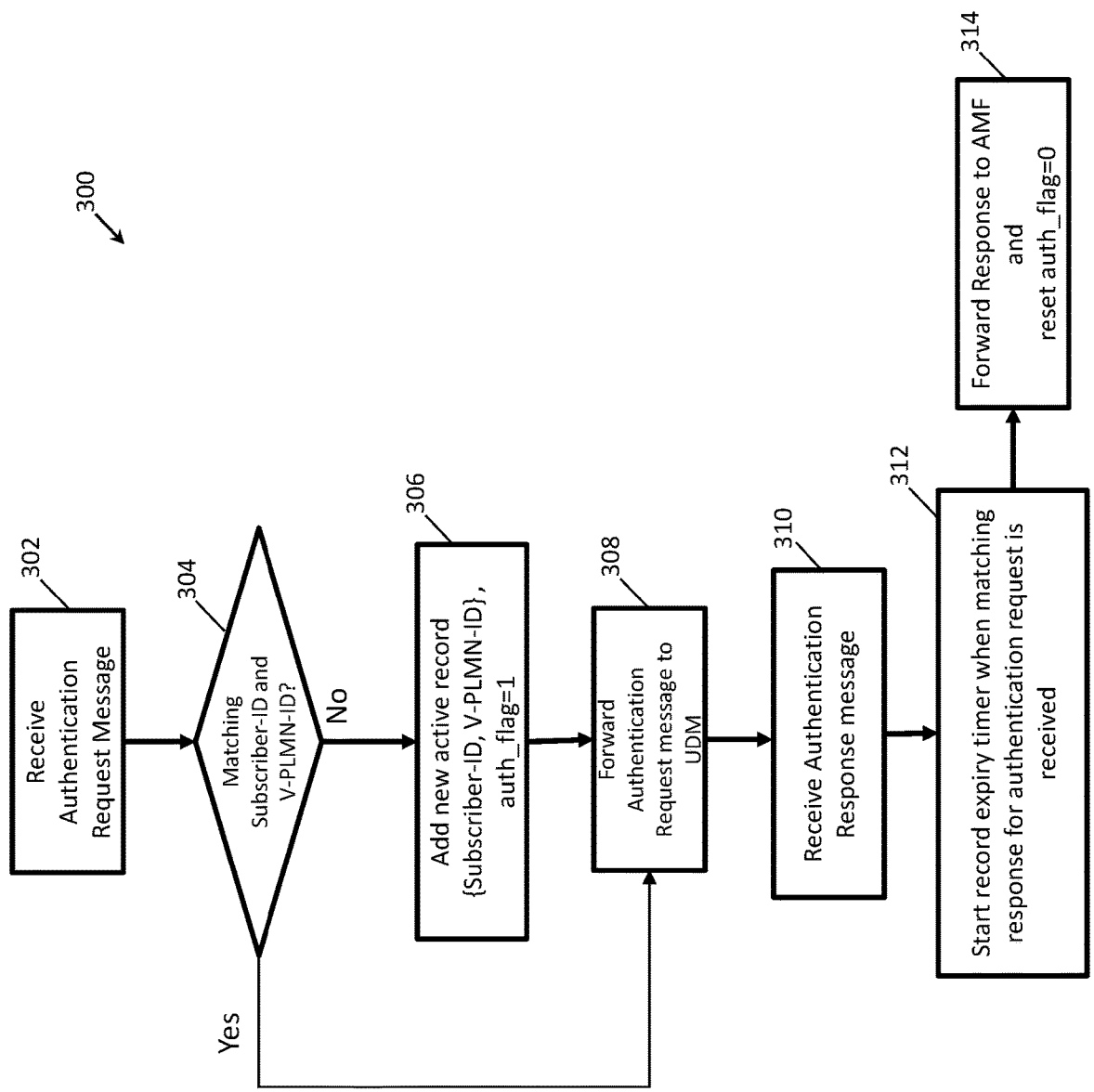
FIG. 3 is a flow diagram illustrating an exemplary method for processing subscriber authentication messages and corresponding responses at an SEPP.

FIG. 3 illustrates a flow diagram illustrating a method 300 for processing an ingress subscriber authentication request message and a corresponding authentication response message at a proxy element. Notably, method 300 can be performed by any proxy element type (e.g., an SEPP, SCP, etc.), but FIG. 3 illustrates the use of an SEPP servicing a subscriber roaming in a visited PLMN for sake of illustration and clarity. A corresponding figure utilizing the SCP as the responsible proxy element is depicted below in FIG. 8. In some embodiments, when a subscriber authentication request message is initiated by a roaming subscriber's user equipment in the visited PLMN, the subscriber authentication request message will be received by a home network SEPP before proceeding into the home PLMN. As described below, the SEPP associated with the home PLMN can be deployed as a validation entity. In other embodiments, the SEPP associated with the visited PLMN can be configured to operate as the validation entity.

In step 302, the SEPP receives a subscriber authentication request message from a visited AMF. Notably, the subscriber authentication request message received by the SEPP is associated with a mobile subscriber roaming in the visited PLMN.

In step 304, the SEPP determines if its local authentication registry database (e.g., a mapping database) contains a previously stored authentication record entry that includes a subscriber identifier and PLMN identifier that respectively match the subscriber-ID and VPLMN-ID contained in the subscriber authentication request message received from the visited AMF. If a matching record entry (i.e., a record entry with the matching subscriber-ID and VPLMN-ID) exists in the authentication registry database at the SEPP, then method 300 proceeds to step 308 where the authentication request message is forwarded by the SEPP to the AUSF/UDM. If a matching record entry does not exist at the SEPP, then method 300 proceeds to step 306, where the SEPP is configured to store the subscriber-ID and VPLMN-ID contained in the received subscriber authentication request message as a new record entry in the local authentication registry database (and proceeds to step 308). For example, a new record entry is generated/added by the SEPP to serve as a record of a roaming subscriber attempting to register/connect from a particular VPLMN.

After the subscriber authentication request message is sent by the SEPP to the home AUSF/UDM, the SEPP is configured to wait to receive a corresponding subscriber authentication response message from the AUSF/UDM (see step 310). In step 312, in response to receiving the subscriber authentication response message, the SEPP is configured to initiate a first timer, such as a 'subsequent_request_timer'. In some embodiments, the subsequent_request_timer is started when the subscriber authentication response message matching the subscriber authentication request message is received at the SEPP and/or right before the subscriber authentication response message is forwarded to the visited AMF. Notably, the subsequent_request_timer indicates an amount of time (e.g., a predefined time period) in which the SEPP should receive a subsequent request message back from the AMF (after the SEPP sends the subscriber authentication response message to the AMF in step 314 below). If a subsequent request message is not received by the SEPP from the AMF in a sufficient amount of time (e.g., after the expiration of the subsequent_request_timer as indicated by the predefined time period), this serves as an indication that an error occurred and/or something is suspicious and/or wrong.

In step 314, the SEPP forwards the subscriber authentication response message received from the AUSF/UDM to the original AMF (i.e., the visited AMF that sent the initial subscriber authentication request message). At this time, the SEPP is further configured to reset the authentication flag in the local record entry to zero (e.g., auth_flag=0). Specifically, the authentication flag should be reset to zero by the SEPP (and/or the SAPM) if the response message is received from the UDM. In some embodiments, the SEPP (and/or the SAPM) determines that the authentication flag is set to zero, so that the SEPP will know that the subscriber is not yet authenticated. Notably, the SCP also performs this same function in the home network for non-roaming subscriber scenarios as described below in FIG. 8.

Figure 4:
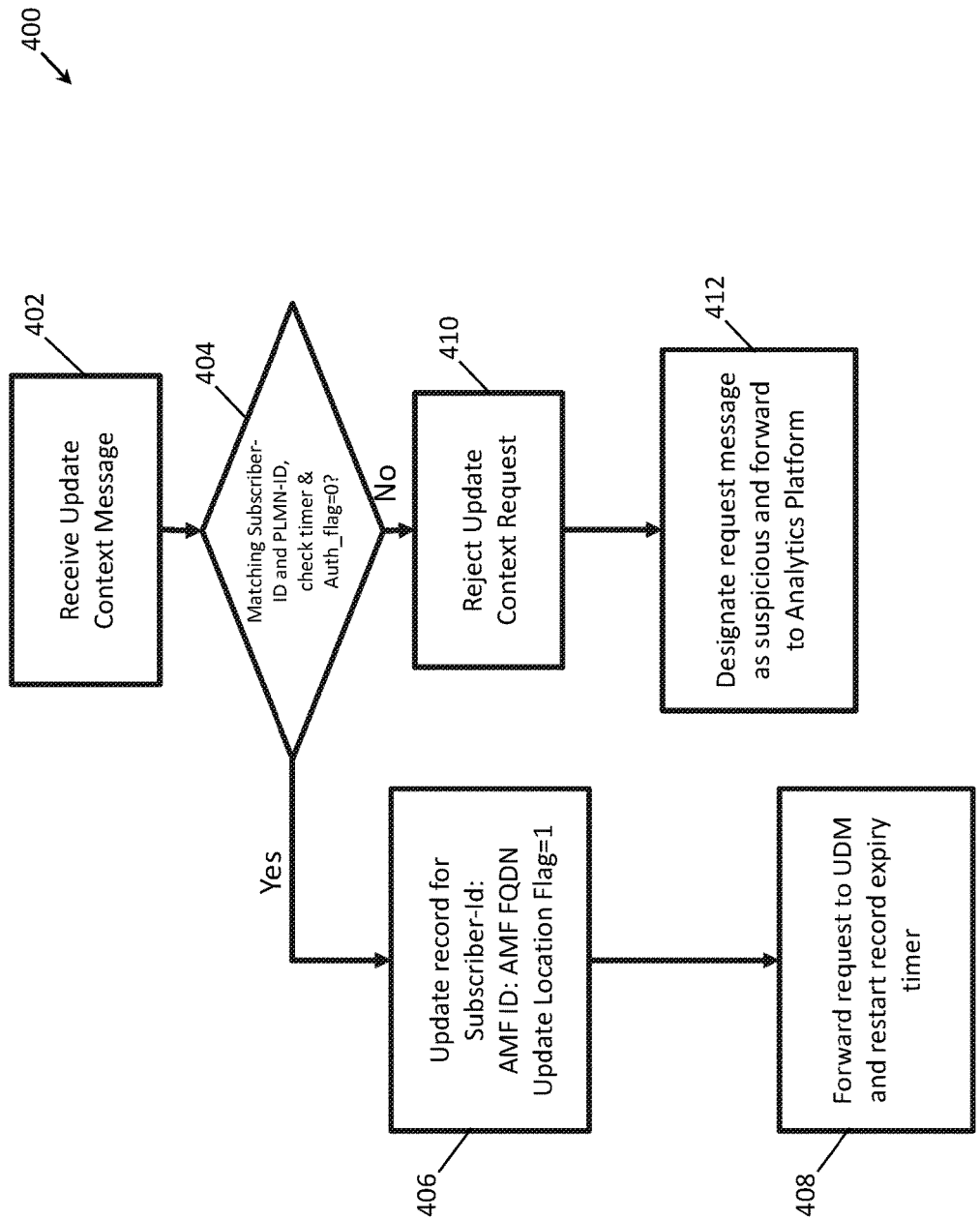
FIG. 4 is a flow diagram illustrating an exemplary method for processing subsequent subscriber update request messages at an SEPP.

FIG. 4 illustrates a flow diagram illustrating a method 400 for processing a subsequent ingress subscriber request message (e.g., a subscriber update context request message or subscriber update registration message that is received after the subscriber authentication response message is sent by the SEPP to an AMF in method 300). In step 402, an update context request message is received by the SEPP from an AMF. In step 404, the SEPP is configured to determine if a matching set of subscriber-ID and VPLMN-ID is found in the received request message. For example, after receiving an update context request message (e.g., a UE_CM request message), the SEPP is configured to determine if a previously stored record entry (e.g., a record entry containing subscriber-ID and VPLMN-ID in the local authentication registry database) matches the subscriber ID information and visited PLMN ID information that is contained in the received update context request message. In step 404, the SEPP is also configured to check that the subsequent_request_timer has not expired and that the authentication flag is set to zero. If the subsequent_request_timer has exceeded predefined/acceptable limits, then method 400 immediately proceeds to block 410 (see details below).

If a matching record entry is present in the local authentication registry database (and the subsequent_request_timer has not expired), method 400 proceeds to step 406 where the SEPP is configured to update the subscriber record entry with an AMF identifier (e.g., the FQDN of the visited AMF). The SEPP also updates the record entry in the authorization registry database with a record that indicates that the update request (i.e., the UE_CM request message) was forwarded to the AUSF/UDM. In addition, the request message may include an 'Update Location Flag' equal to '1', which indicates that the request message has not yet been forwarded to the AUSF/UDM. In some embodiments, the SEPP may be configured to conduct an additional check for authentication status (e.g., auth_flag='0'). Method 400 then proceeds to step 408 where the SEPP is configured to forward the update context request message to the AUSF/UDM. In response to forwarding the request message, the SEPP may restart the record expiry timer. The record expiry timer indicates an amount of time the SEPP expects a response from the AUSF/UDM (or else the SEPP deletes the associated record entry).

At step 404, if a matching record entry is not present in the local authentication registry database, i.e., no matching subscriber ID and VPLMN-ID is present in the registry database (and/or SEPP may also be configured to check to see if subsequent_request_timer has exceeded the predefined allowed limits), method 400 proceeds to step 410 where the SEPP identifies and/or designates the update request message as suspicious. Specifically, the SEPP may be configured to reject the update context request message after making such an identification and/or designation.

In step 412, the SEPP marks or flags the request message as suspicious and forwards the request message to an analytics platform. Notably, the analytics platform can parse and/or analyze the suspicious message to identify parameters that can be used to identify the malicious actor(s). Such information can ultimately be used to prevent future attacks from the identified spoofing entities.

Figure 5:
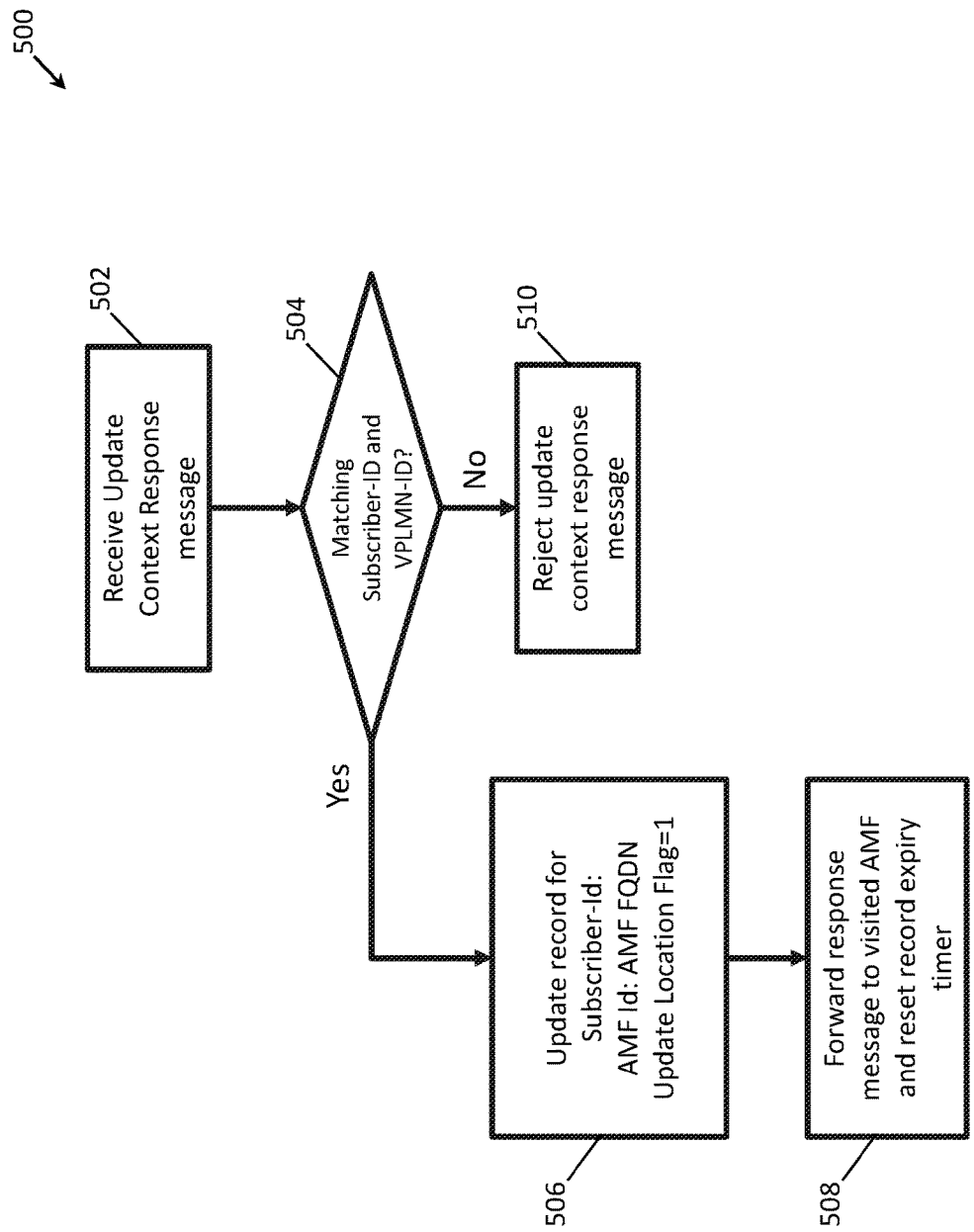
FIG. 5 is a flow diagram illustrating an exemplary method for processing response messages corresponding to the subsequent subscriber update request messages at an SEPP.

FIG. 5 illustrates a flow diagram illustrating a method 500 for processing a subsequent response message to a subscriber request message at an SEPP (e.g., a subscriber update context response message that is received after the subscriber update context request message described in method 400). In step 502, an update context response message is received. In some embodiments, the SEPP is configured to receive an update context response message that is directed to the visited AMF and sent by the AUSF/UDM. In step 504, the SEPP is configured to determine if a record entry including a subscriber-ID and VPMN-ID in the local authentication registry database matches the subscriber-ID and VPMN-ID contained in the received update context response message. If a matching record entry is present in the local authentication registry database (and the auth_flag in the response message is set to "0"), method 500 proceeds to step 506 where the SEPP is configured to update the record entry for the subscriber-ID to include the AMF identifier (e.g., the FQDN of the AMF). The SEPP is also configured to reset the update location flag in the update context response message to '0' at this time.

In step 508, the SEPP is configured to forward the update context response message to the visited AMF and reset the record expiry timer at the SEPP.

Returning to step 504, if a matching record entry is not present in the local authentication registry database (e.g., a record entry may have been cleared due to record entry deletion or may have never existed), method 500 proceeds to step 510 where the SEPP rejects the update context response message (i.e., the response message is not forwarded to the intended AMF).

Figure 6:
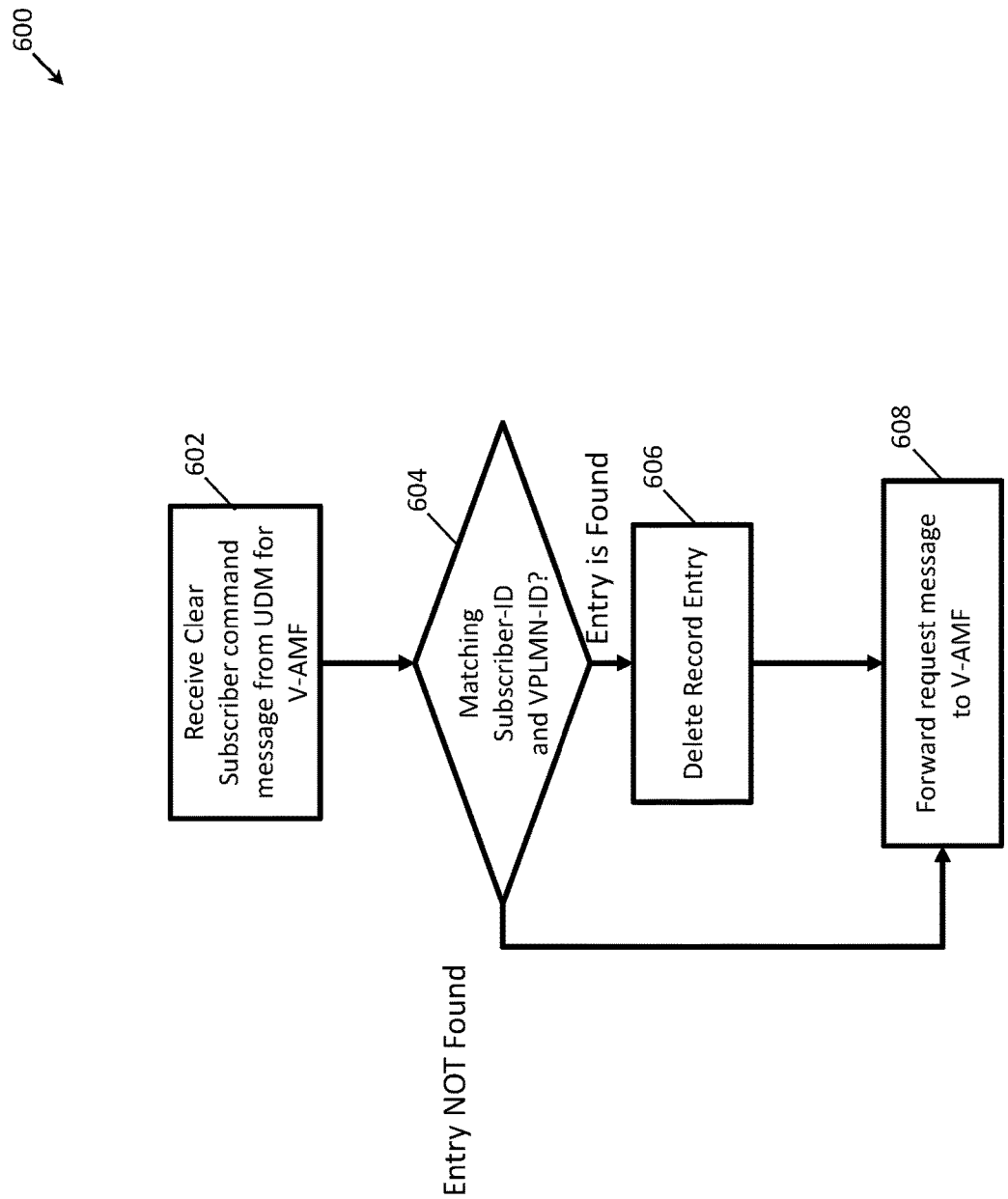
FIG. 6 is a flow diagram illustrating an exemplary method for processing network initiated clear subscriber record request messages at an SEPP.

FIG. 6 illustrates a flow diagram illustrating a method 600 for processing a network initiated subscriber record removal or purge at the SEPP. In step 602, the SEPP receives a 'clear subscriber' command request message from the UDM for the visiting AMF. In some embodiments, the clear subscriber command request message is triggered by a network initiated change (e.g., when the AUSF and/or UDM requires a subscriber record delete or purge). In step 606, the SEPP determines if the clear subscriber command request message intended for the visiting AMF includes a subscriber-ID and a VPLMN-ID that match the subscriber-ID and a VPLMN-ID in a previously stored record entry of its local authentication registry database. If a matching record entry is not found, method 600 proceeds to step 608 where the clear subscriber command request message is forwarded by the SEPP to the visited AMF. If a matching record entry (i.e., match of subscriber-ID and VPLMN-ID of the clear subscriber request message) is found, method 600 proceeds to step 608 where the SEPP deletes the record entry. For example, the SEPP is configured to appropriately remove the record entry using a subscriber deletion or subscriber reset operation/functionality. After the matching record entry is deleted, method 600 proceeds to step 610 where the clear subscriber command request message is forwarded by the SEPP to the AMF.

In some embodiments, the SEPP is further configured to process the record entries in accordance to the record expiry timer (as described above). For example, the expiration of a record entry's internal record expiry timer may be monitored and/or detected by the SEPP. In response to the detected expiration, the SEPP may delete the record entry (which represents a stale session and/or record) containing the expired record expiry timer from the authentication registry mapping database.

Figure 7:
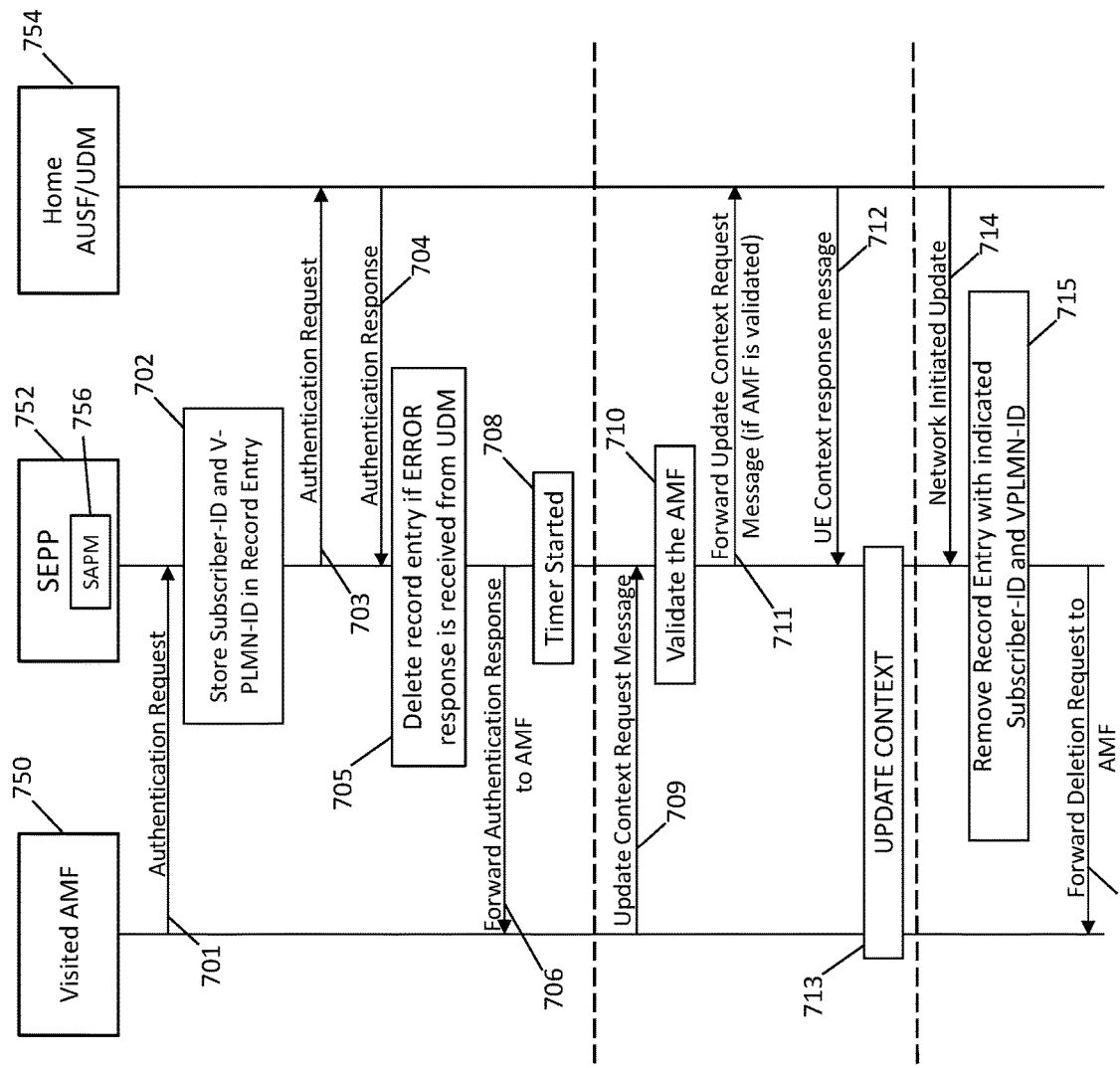
FIG. 7 is a signaling diagram illustrating the exemplary methods involved with validating mobile subscriber entities at an SEPP against spoofing attacks in a communications network.

FIG. 7 is a signaling diagram illustrating the exemplary methods involved with validating mobile subscriber entities against spoofing attacks in a communications network. In particular, FIG. 7 presents the signaling conducted via the SEPP (and/or SAPM) in accordance to the methods depicted in FIGS. 3-6. For example, SEPP 752 (and/or SAPM 756) receives a subscriber authentication request message 701 from AMF 750 and stores the contained subscriber-ID and VPLMN-ID as a record entry in an authentication registry database. SEPP 752 then forwards the subscriber authentication request message 703 to the AUSF/UDM 754 and receives a subscriber authentication response message 704. SEPP 752 (and/or SAPM 756) is then configured to compare the subscriber ID and VPLMN ID in the response message with the IDs stored in the record entry and delete the record entry if an error is detected (e.g., there is no match) and/or if an error response is received from UDM 754.

If no errors are present, SEPP 752 (and/or SAPM 756) is then configured to forward the subscriber authentication response message 706 to AMF 750. In addition to forwarding message 706, a subsequent_request_timer is initiated at the SEPP (see block 708). After some time, AMF 750 sends a subsequent update context request message 709 to AUSF/UDM 754 via SEPP 752. In step 710, SEPP 752 (and/or SAPM 756) validates AMF 750 by comparing the subscriber ID and VPLMN ID with the same IDs stored in the local authentication registry database (and confirming that the subsequent_request_timer has not exceeded a predefined allowed threshold time limit). Notably, AMF 750 is validated if a registry entry containing the matching IDs is located. If AMF 750 is validated in step 710, SEPP 752 forwards the update context request message 711 to AUSF/UDM 754, which ultimately responds with an update context response message 712 (e.g., before an associated registry expiry time expires at the SEPP). After receiving message 712, SEPP 752 is configured to provide the updated context information to AMF 750 (see block 713). In some embodiments, a network initiated update message 714 is sent by AUSF/UDM 754. Upon receiving update message 714 (e.g., a clear subscriber command), SEPP 752 is configured to remove the record entry with the indicated subscriber ID and VPLMN ID (in message 714) from the authentication registry database (see block 715). Afterwards, SEPP 752 is configured to forward the associated deletion request 716 to AMF 750.

As indicated above, the operation of the SAPM can be conducted at an SCP in order to implement the spoofing attack prevention within a home network (i.e., subscriber UE is not roaming and is only operating in the home network). Examples of implementing the SAPM in such a manner are described below and illustrated in FIGS. 8-11.

Figure 8:
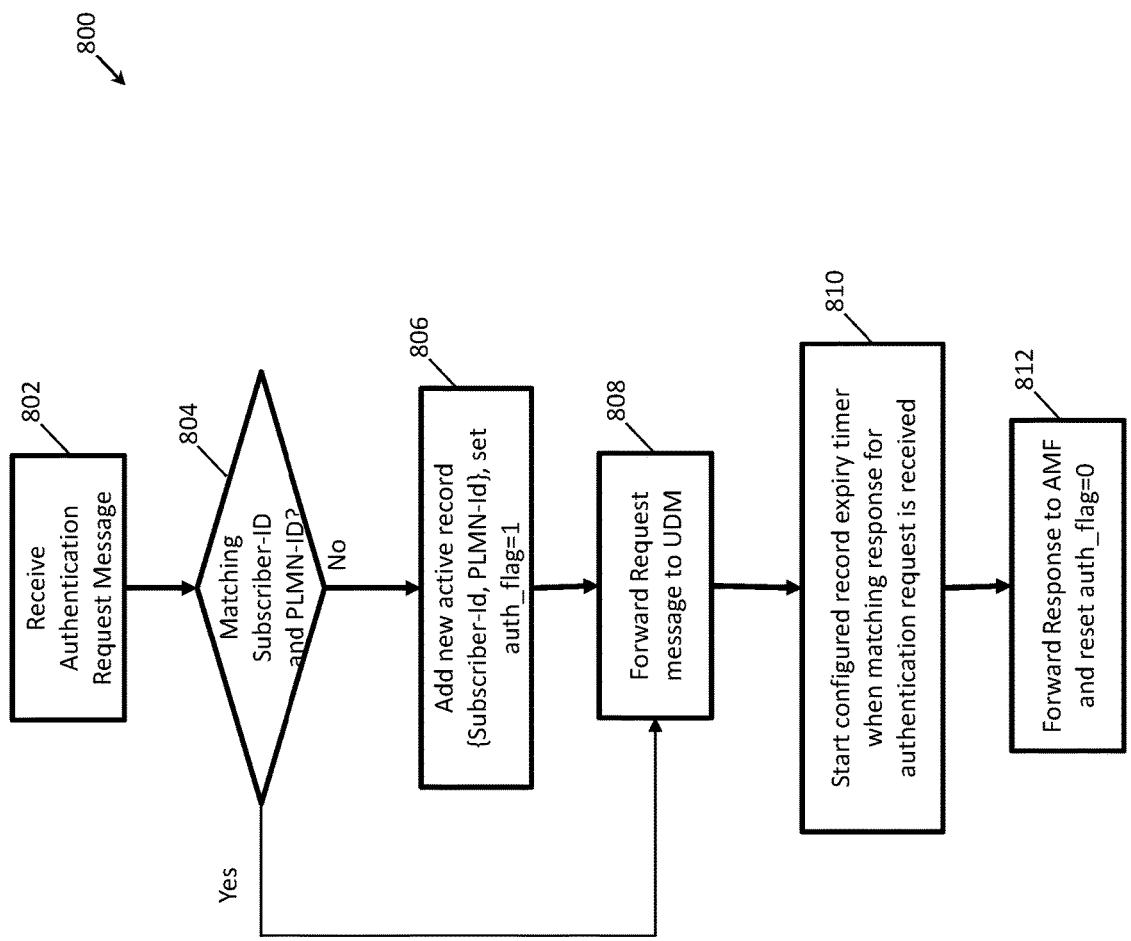
FIG. 8 is a flow diagram illustrating an exemplary method for processing subscriber authentication messages and corresponding responses at an SCP.

FIG. 8 illustrates a flow diagram illustrating a method 800 for processing an ingress subscriber authentication request message and a corresponding authentication response message at a proxy. In some embodiments, when a subscriber authentication request message is initiated by a non-roaming subscriber's user equipment in the home PLMN, the subscriber authentication request message will be received by an SCP in the home PLMN. As described below, the SCP associated with the home PLMN can be deployed as a validation entity. Notably, 800 can be performed by any proxy element type (e.g., an SEPP, SCP, etc.), but FIG. 8 illustrates the use of an SCP servicing a non-roaming subscriber in a home PLMN for sake of illustration and clarity. A corresponding figure utilizing the SEPP as the responsible proxy element is depicted above in FIG. 3.

In step 802, the SCP receives a subscriber authentication request message (associated with a non-roaming subscriber) from a AMF in the home PLMN.

In step 804, the SCP determines if its local authentication registry database (e.g., a mapping database) contains a previously stored authentication record entry that includes a subscriber identifier and PLMN identifier that respectively match the subscriber-ID and HPLMN-ID contained in the subscriber authentication request message received from the AMF. If a matching record entry (i.e., a record entry with the matching subscriber-ID and HPLMN-ID) exists in the authentication registry database at the SCP, then method 800 proceeds to step 808 where the authentication request message is forwarded by the SCP to the AUSF/UDM. If a matching record entry does not exist at the SCP, then method 800 proceeds to step 806, where the SCP is configured to store the subscriber-ID and HPLMN-ID contained in the received subscriber authentication request message as a new created record entry in the local authentication registry database (and proceeds to step 808). The authentication flag of the new record entry is also set to "1".

After the subscriber authentication request message is sent by the SCP, the SCP is configured to wait to receive a corresponding 201-created/200-OK message from the AUSF/UDM (see step 810). In step 812, in response to receiving the subscriber authentication response message, the SCP is configured to initiate a 'subsequent_request_timer'. In some embodiments, the subsequent_request_timer is started when the subscriber authentication service response message matching the subscriber authentication request message is received from the AUSF/UDM at the SCP. Notably, the subsequent_request_timer indicates an amount of time (e.g., a predefined time period) in which the SCP should receive a subsequent request message back from the AMF (after the SCP sends the response message to the AMF in step 814 below). If a subsequent request message is received by the SCP from the AMF in an amount of time that exceeds a predefined time period threshold (e.g., subsequent_request_timer exceeds the predefined time period threshold), this serves as an indication that an error occurred and/or something is suspicious and/or wrong (and thus causing the record entry to be deleted by the SCP).

In step 814, the SCP forwards the subscriber authentication response message received from the AUSF/UDM to the original AMF (i.e., the AMF that sent the initial subscriber authentication request message). At this time, the SCP is further configured to reset the authentication flag to zero (e.g., auth_flag=0). Specifically, the authentication flag should be reset to zero by the SCP (and/or the SAPM) if the subscriber is not yet authenticated. In some embodiments, the SCP (and/or the SAPM) is configured to check that the auth flag is set to zero, so that the SCP will know that the authentication responses have been initiated already.

Figure 9:
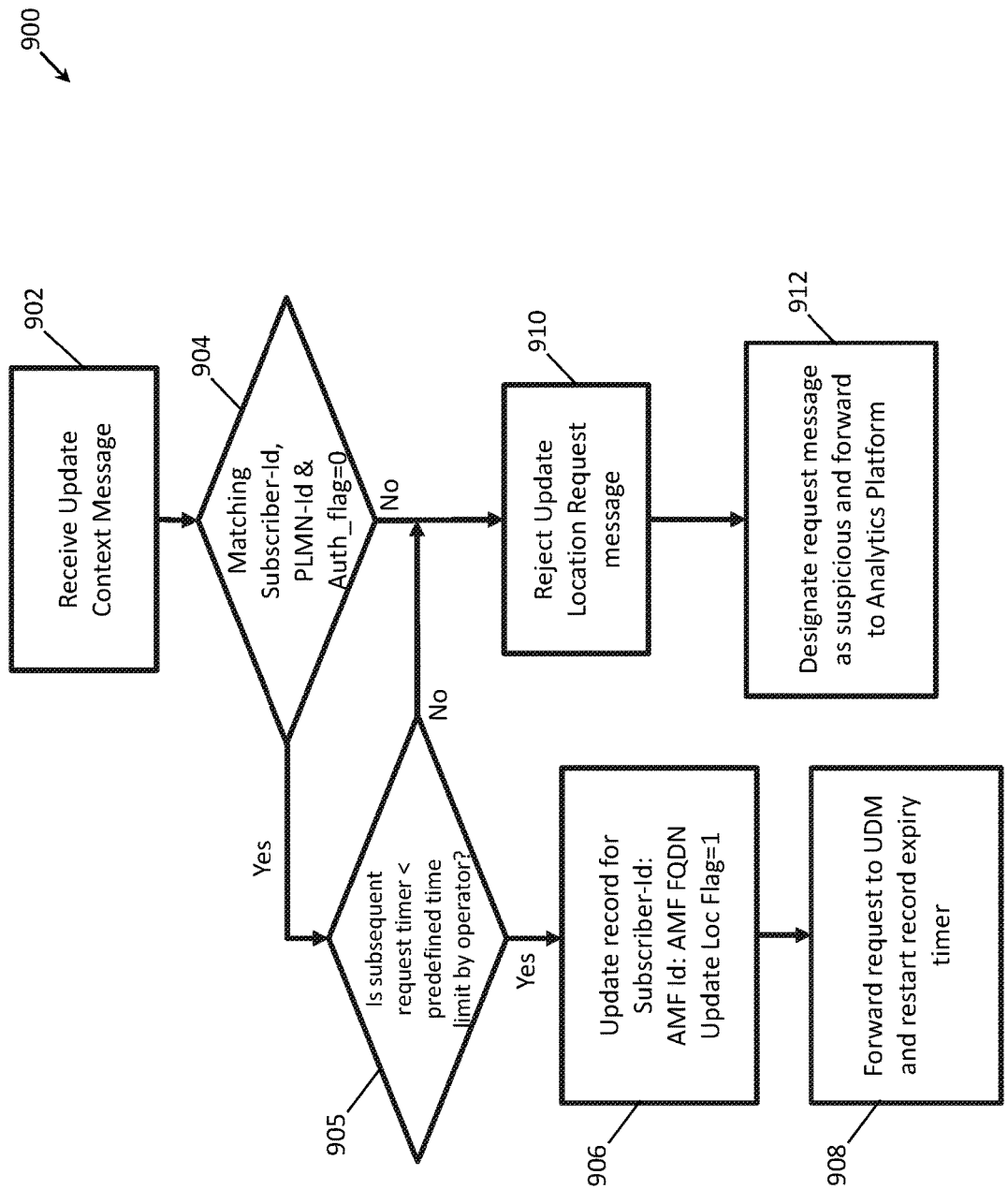
FIG. 9 is a flow diagram illustrating an exemplary method for processing subsequent subscriber update request messages at an SCP.

FIG. 9 illustrates a flow diagram illustrating a method 900 for processing a subsequent ingress subscriber request message (e.g., a subscriber update context request message or subscriber update registration message that is received after the subscriber authentication response message is sent by the SCP in method 800). In step 902, an update context request message is received by the SCP. In step 904, the SCP is configured to determine if a matching set of subscriber-ID and HPLMN-ID is found in the received request message. For example, after receiving an update context request message (e.g., a UE_CM request message), the SCP is configured to determine if a previously stored record entry (e.g., a record entry containing subscriber-ID and HPLMN-ID in the local authentication registry database) matches the subscriber ID information and home PLMN ID information that is contained in the received update context request message.

If a matching record entry is present in the local authentication registry database, method 900 proceeds to step 905 where the SCP is configured to determine if the subsequent request timer has not exceeded a predefined time limit set by the network operator. If the subsequent request timer is still less than the predefined time limit/threshold, then method 900 continues to step 906. Otherwise, method 900 continues to step 910 where the update context request message is rejected (see step 910 below for additional details).

In step 906, the SCP is configured to update the subscriber record entry with an AMF identifier (e.g., the FQDN of the visited AMF). The SCP is also configured to update the record entry in the authorization registry database with a record that indicates that the update request (i.e., the UE_CM request message) was forwarded to the AUSF/UDM. In addition, the request message may include an 'Update Location Flag' equal to '1', which indicates that the request message has not yet been forwarded to the AUSF/UDM. In some embodiments, the SCP may be configured to conduct an additional check for authentication status (e.g., auth_flag='0'). Method 900 then proceeds to step 908 where the SCP is configured to forward the update context request message to the AUSF/UDM. In response to forwarding the request message, the SCP may restart the record expiry timer.

Returning to step 904, if a matching record entry is not present in the local authentication registry database (i.e., no matching subscriber ID and HPLMN-ID is present in the authentication registry database), method 900 proceeds to step 910 where the SCP identifies and/or designates the update request message as suspicious. Specifically, the SCP may be configured to reject the update location request message after making such an identification and/or designation.

In step 912, the SCP marks or flags the request message as suspicious and forwards the request message to an analytics platform. Notably, the analytics platform can parse and/or analyze the suspicious message to identify parameters that can be used to identify the malicious actor(s). Such information can ultimately be used to prevent future attacks from the identified spoofing entities.

Figure 10:
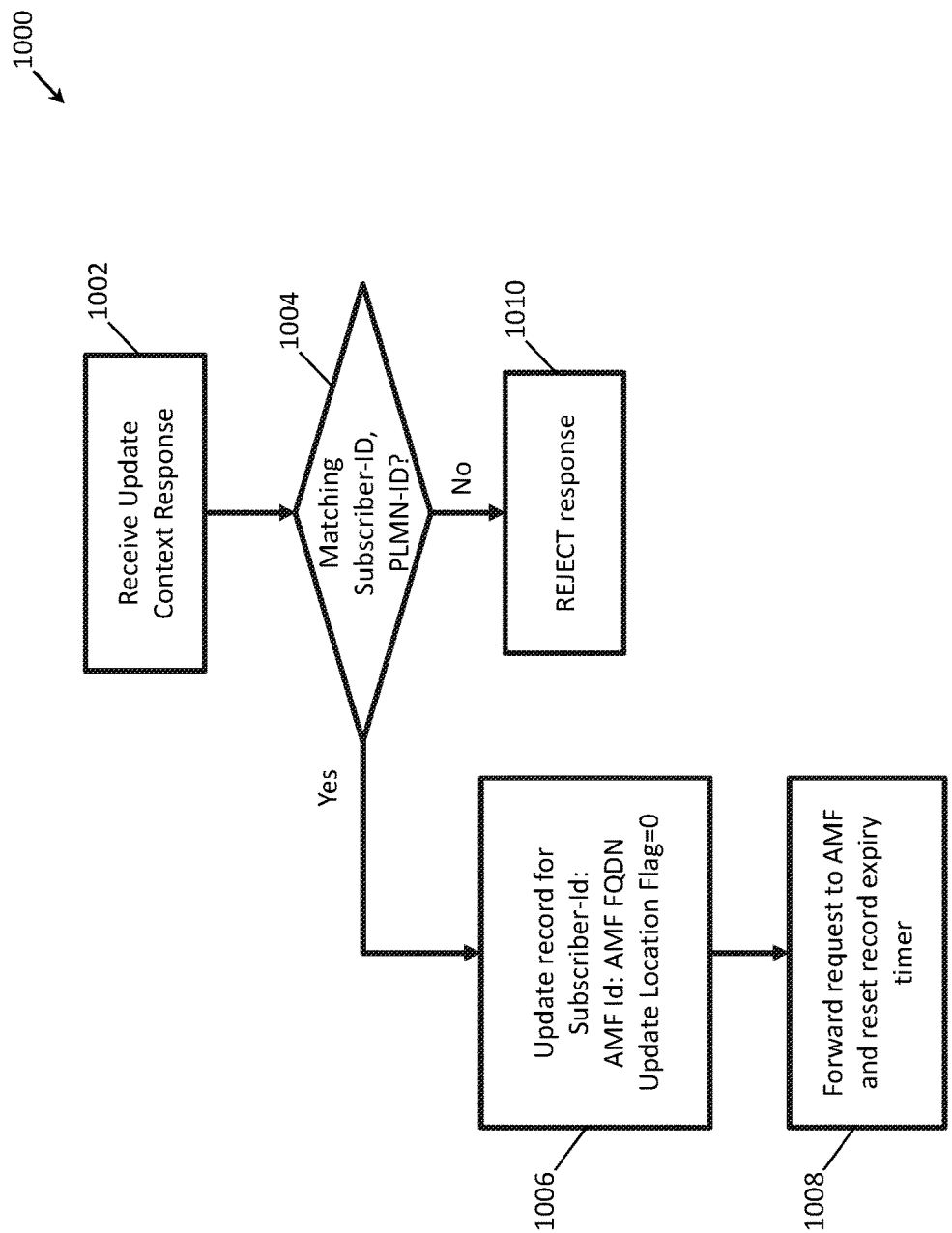
FIG. 10 is a flow diagram illustrating an exemplary method for processing response messages corresponding to the subsequent subscriber update request messages at an SCP.

FIG. 10 illustrates a flow diagram illustrating a method 1000 for processing a subsequent response message to a subscriber request message at an SCP (e.g., a subscriber update context response message that is received after the subscriber update context request message described in method 1000). In step 1002, an update context response message is received. In some embodiments, the SCP is configured to receive an update context response message that is directed to the AMF in the home network and sent by the AUSF/UDM. In step 1004, the SCP is configured to determine if a record entry including a subscriber-ID and HPMN-ID in the local authentication registry database matches the subscriber-ID and HPMN-ID contained in the received update context response message. If a matching record entry is present in the local authentication registry database and the auth_flag in the response message is set to "0", method 1000 proceeds to step 1006 where the SCP is configured to update the record entry for the subscriber-ID to include the AMF identifier (e.g., the FQDN of the AMF). The SCP is also configured to reset the update location flag in the update context response message to '0' at this time.

In step 1008, the SCP is configured to forward the update context response message to the AMF and reset the record expiry timer at the SCP.

Returning to step 1004, if a matching record entry is not present in the local authentication registry database (e.g., a record entry may have been cleared due to record entry deletion), method 1000 proceeds to step 1010 where the SCP rejects the update context response message (i.e., the response message is not forwarded to the intended AMF).

Figure 11:
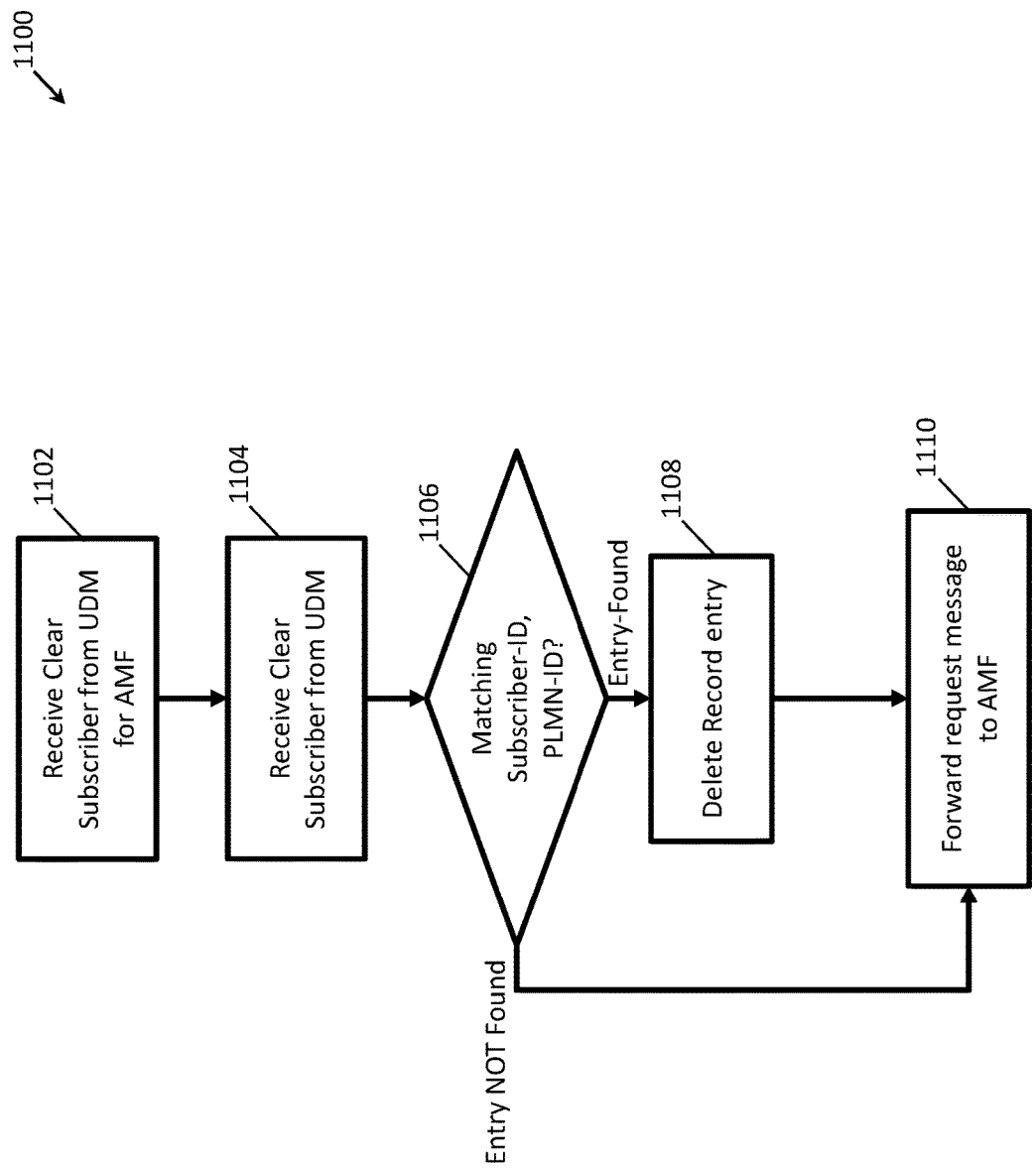
FIG. 11 is a flow diagram illustrating an exemplary method for processing network initiated clear subscriber record request messages at an SCP.

FIG. 11 illustrates a flow diagram illustrating a method 1100 for processing a network initiated subscriber record removal or purge at the SCP. In step 1102, the SEPP receives a 'clear subscriber' command request message from the UDM for the AMF in the home network. In some embodiments, the clear subscriber command request message is triggered by a network initiated change (e.g., when the AUSF and/or UDM requires a subscriber record delete or purge). In step 1106, the SCP determines if the clear subscriber command request message intended for the AMF includes a subscriber-ID and a HPLMN-ID that match the subscriber-ID and a HPLMN-ID in a previously stored record entry of its local authentication registry database. If a matching record entry is not found, method 1100 proceeds to step 1108 where the clear subscriber command request message is forwarded by the SCP to the AMF. If a matching record entry (i.e., match of subscriber-ID and HPLMN-ID of the clear subscriber request message) is found, method 1100 proceeds to step 1108 where the SCP deletes the record entry. For example, the SCP is configured to appropriately remove the record entry using a subscriber deletion or subscriber reset operation/functionality. After the matching record entry is deleted, method 1100 proceeds to step 1110 where the clear subscriber command request message is forwarded by the SCP to the AMF.

In some embodiments, the SCP is further configured to process the record entries in accordance to the record expiry timer (as described above). For example, the expiration of an internal record expiry timer may be detected by the SCP. In response, the SCP may delete record entries (which represent stale sessions and/or records) associated with the expired record expiry timer from the authentication registry mapping database.

Figure 12:
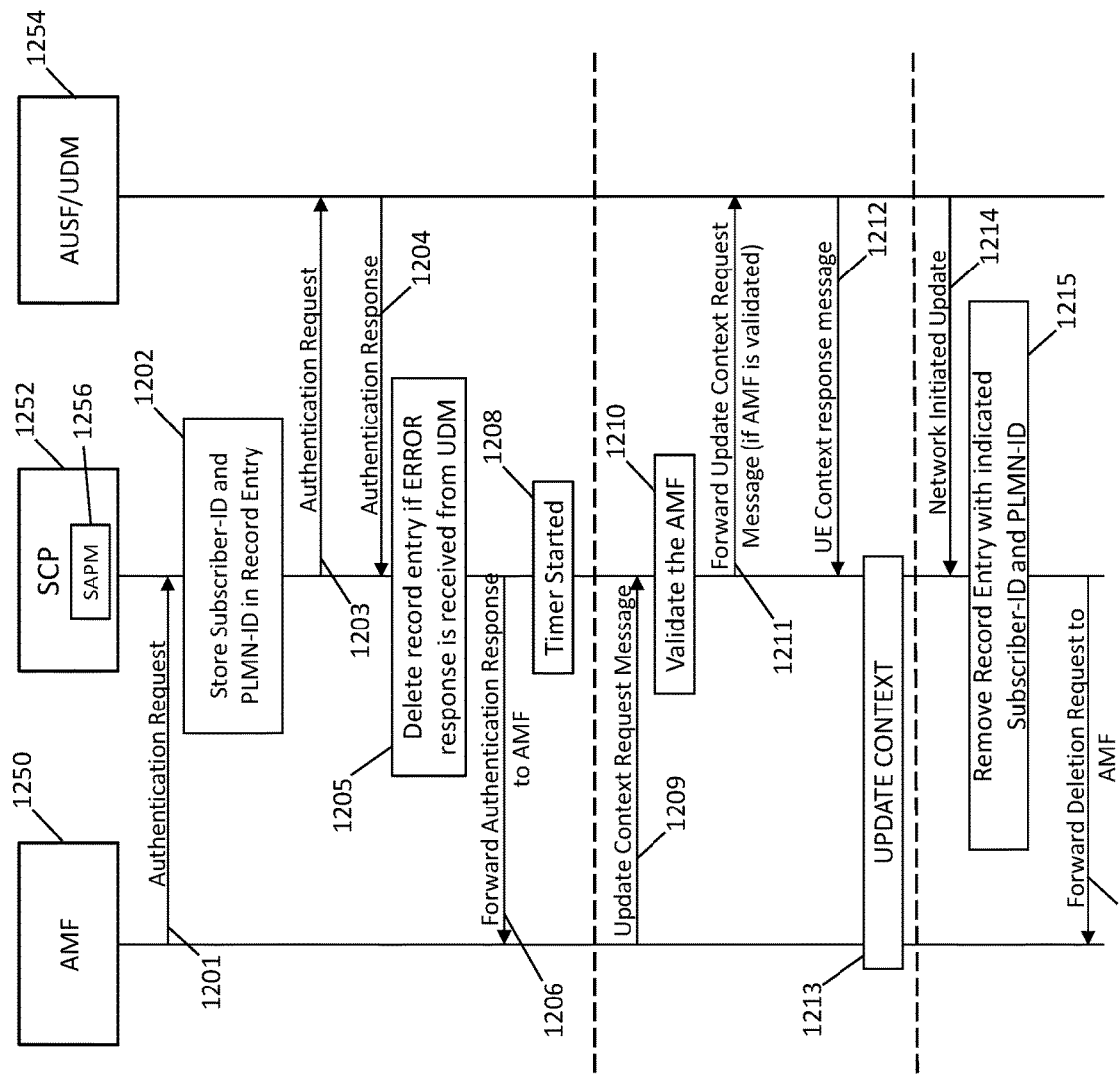
FIG. 12 is a signaling diagram illustrating the exemplary methods involved with validating mobile subscriber entities at an SCP against spoofing attacks in a communications network.

FIG. 12 is a signaling diagram illustrating the exemplary methods involved with validating mobile subscriber entities against spoofing attacks in a communications network. In particular, FIG. 12 presents the signaling conducted via the SCP (and/or SAPM) in accordance to the methods depicted in FIGS. 8-11. For example, SCP 1252 (and/or SAPM 1256) receives a subscriber authentication request message 1201 from AMF 1250 and stores the contained subscriber-ID and PLMN-ID (of the home network) as a record entry in an authentication registry database. SCP 1252 then forwards the subscriber authentication request message 1203 to the AUSF/UDM 1254 and receives a subscriber authentication response message 1204. SCP 1252 (and/or SAPM 1256) is then configured to compare the subscriber ID and PLMN ID in the response message with the IDs stored in the record entry and delete the record entry if an error is detected (e.g., there is no match) and/or if an error response is received from UDM 1254.

If no errors are present, SCP 1252 (and/or SAPM 1256) is then configured to forward the subscriber authentication response message 1206 to AMF 1250. In addition to forwarding message 1206, a subsequent_request_timer is initiated at the SCP (see block 1208). After some time, AMF 1250 sends a subsequent update context request message 1209 to AUSF/UDM 1254 via SCP 1252. In step 1210, SCP 1252 (and/or SAPM 756) validates AMF 1250 by comparing the subscriber ID and PLMN ID with the same IDs stored in the local authentication registry database (and confirming that the subsequent_request_timer has not exceeded a predefined allowed threshold time limit). Notably, AMF 1250 is validated if a registry entry containing the matching IDs is located. If AMF 1250 is validated in step 1210, SCP 1252 forwards the update context request message 1211 to AUSF/UDM 1254, which ultimately responds with an update context response message 1212 (e.g., before an associated registry expiry time expires at the SCP). After receiving message 1212, SCP 1252 is configured to provide the updated context information to AMF 1250 (see block 213). In some embodiments, a network initiated update message 1214 is sent by AUSF/UDM 1254. Upon receiving update message 1214 (e.g., a clear subscriber command), SCP 1252 is configured to remove the record entry with the indicated subscriber ID and PLMN ID (in message 1214) from the authentication registry database (see block 1215). Afterwards, SCP 1252 is configured to forward the associated deletion request 1216 to AMF 1250.

Figure 13:
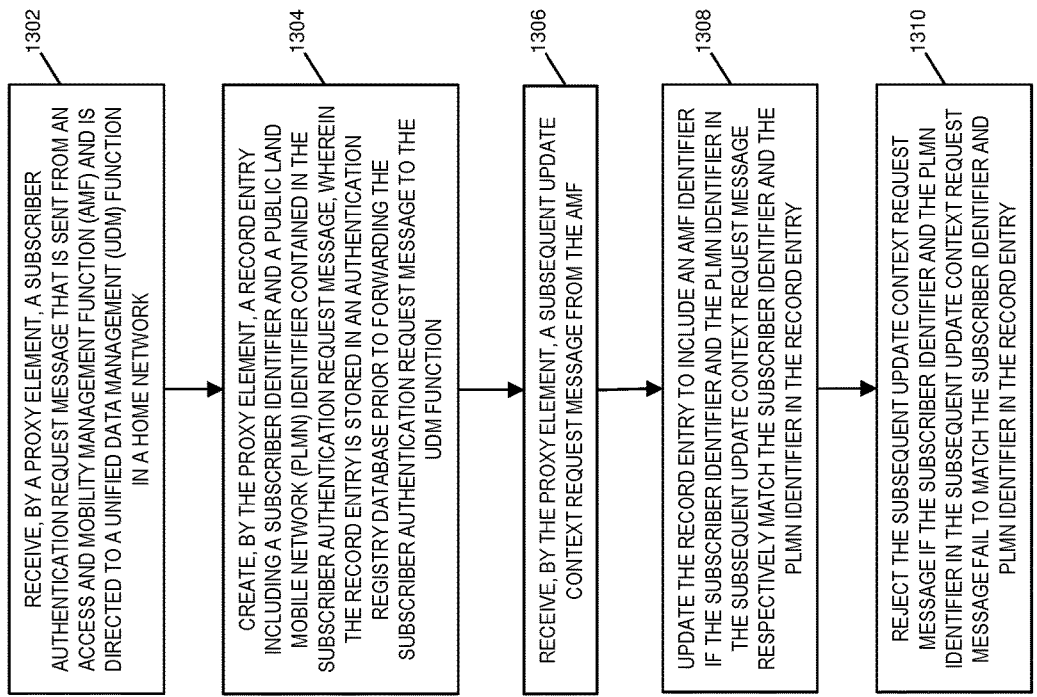
FIG. 13 is a block diagram illustrating a network proxy configured for validating mobile subscriber entities against spoofing attacks in a communications network according to an embodiment of the subject matter described herein.
Figure 14:
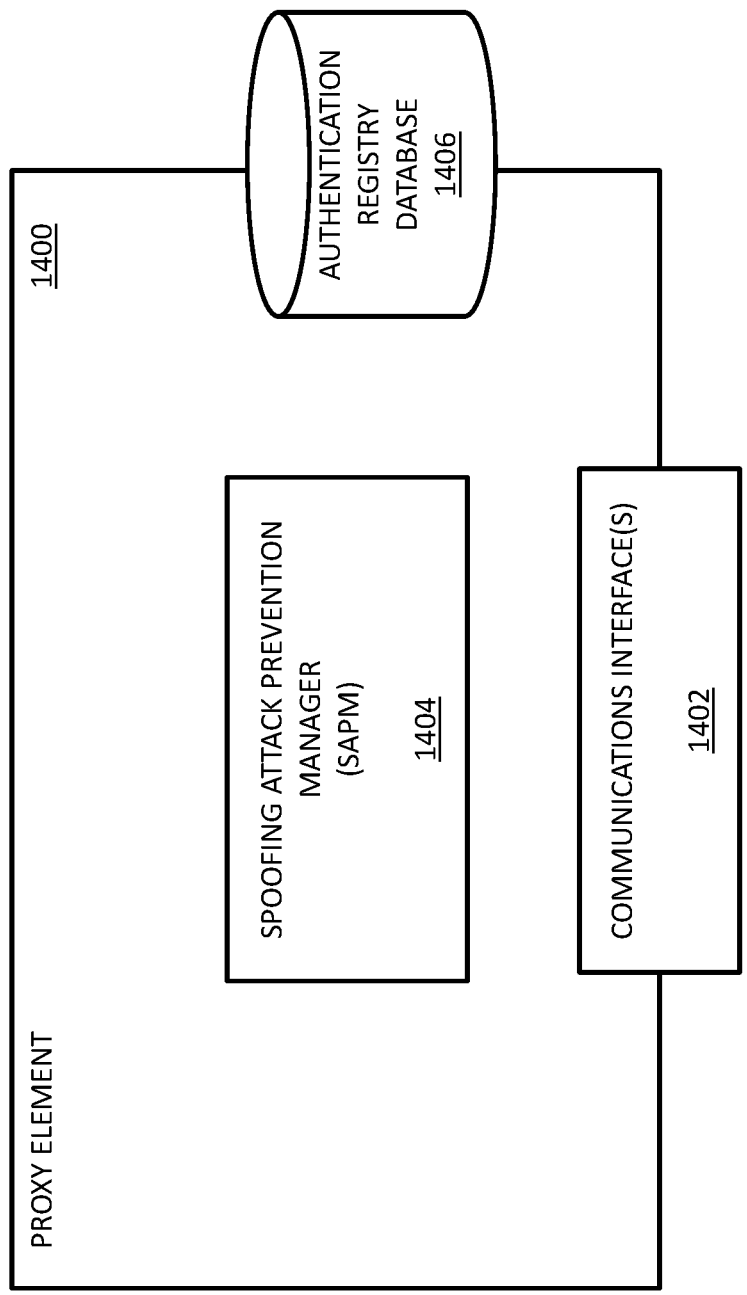
FIG. 14 is a block diagram illustrating an exemplary proxy element that is configured for validating mobile subscriber entities against spoofing attacks in a communications network according to an embodiment of the subject matter described herein.

FIG. 13 is a flow chart illustrating an example process for validating mobile subscriber entities against spoofing attacks in a communications network according to an embodiment of the subject matter described herein. In some embodiments, method 1300 depicted in FIG. 13 is an algorithm, program, or script (e.g., a spoofing attack prevention manager as shown in FIG. 14 below) stored in memory that when executed by a processor performs the steps recited in blocks 1302-1310. In some embodiments, the method 1300 represents a list of steps (or changes in steps) embodied in a state machine (e.g., either via software code programming or via a set of rules) and/or logic of the proxy element and/or the SAPM.

In block 1302, a subscriber authentication request message that is sent from an access and mobility management function (AMF) and is directed to a unified data management (UDM) function in a home network is received by a proxy element.

In block 1304, a record entry including a subscriber identifier and a public land mobile network (PLMN) identifier contained in the subscriber authentication request message is created by the proxy element, wherein the record entry is stored in an authentication registry database prior to forwarding the subscriber authentication request message to the UDM function.

In block 1306, a subsequent update context request message from the AMF is received by the proxy element.

In block 1308, the record entry is updated to include an AMF identifier if the subscriber identifier and the PLMN identifier in the subsequent update context request message respectively match the subscriber identifier and the PLMN identifier in the record entry.

In block 1310, the subsequent update context request message is rejected if the subscriber identifier and the PLMN identifier in the subsequent update context request message fail to match the subscriber identifier and PLMN identifier in the record entry.

FIG. 14 is a diagram illustrating an example network node, e.g., proxy element 1400, for preventing spoofing attacks in a communications network. Proxy element 1400 may represent any suitable entity or entities (e.g., one or more node(s), device(s), or computing platform(s)) for performing various aspects associated with preventing spoofing attacks in a visited network or home network. In some embodiments, proxy element 1400 may represent or include an authorization server, a network gateway, a network proxy, an edge security device, a SEPP, an SCP, or other functionality.

Referring to FIG. 13, proxy element 1400 may include one or more communications interface(s) 1402 for communicating messages via a communications environment, e.g., one or more 5G networks. For example, communications interface(s) 1402 may include one or more communication interfaces for communicating with various entities in a home network (e.g., home public land mobile network (H-PLMN)) or a visited network (e.g., a visited public land mobile network (V-PLMN)).

Proxy element 1400 may include a spoofing attack prevention manager (SAPM) 1404. SAPM 1404 may be any suitable entity (e.g., software stored in memory and executed on at least one processor of proxy element 1400) for performing one or more aspects associated with preventing spoofing attacks in a communications network. In some embodiments, SAPM 1404 may be configured for receiving a subscriber authentication request message that is sent from an access and mobility management function (AMF) and is directed to a user data management (UDM) function in a home network, creating a record entry including a subscriber identifier and a public land mobile network (PLMN) identifier contained in the subscriber authentication request message, wherein the record entry is stored in an authentication registry database prior to forwarding the subscriber authentication request message to the UDM function, receiving a subsequent update context request message from the AMF, updating the record entry to include an AMF identifier if the subscriber identifier and the PLMN identifier in the subsequent update context request message respectively match the subscriber identifier and the PLMN identifier in the record entry, and rejecting the subsequent update context request message if the subscriber identifier and the PLMN identifier in the subsequent update context request message fail to match the subscriber identifier and PLMN identifier in the record entry.

Proxy element 1400 may also comprise an authentication registry database 1406, which can include any storage medium that is configured to store and maintain database tables that contain record entries including subscriber IDs, PLMN IDs, and the like.

It should be noted that the proxy element, SAPM, and/or functionality described herein may constitute or be facilitated by a special purpose computing device. Further, the SAPM and/or functionality described herein can improve the technological field of network security by providing subscriber validation procedures against spoofing attacks. Implementation of the same reduces the number of spoofing attacks in a visited network and/or home network. Accordingly, subscriber privacy is not compromised since no subscriber data is sent out to the spoofing entity. Moreover, the disclosed subject matter reduces the load on the AUSF/UDM, since these network elements are not relied upon to identify these spoofing scenarios.

The disclosure of each of the following references is incorporated herein by reference in its entirety.

REFERENCES 1. 3$^{rd}$ Generation Partnership Project; Technical Specification 5G; 5G System; Unified Data Management Services; Stage 3 (Release 16) 3GPP TS 29.503 V16.4.0 (2020-07)
2. 3$^{rd}$ Generation Partnership Project; Technical Specification 5G; 5G System; Authentication Server Services; Stage 3 (Release 16) 3GPP TS 29.509 V16.6.0 (2021-01)

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for validating mobile subscriber entities against spoofing attacks in a communications network, the method comprising:
   receiving, by a proxy element, a subscriber authentication request message that is sent from an access and mobility management function (AMF) and is directed to a unified data management (UDM) function in a home network;
   creating, by the proxy element, a record entry including a subscriber identifier and a public land mobile network (PLMN) identifier contained in the subscriber authentication request message, wherein the record entry is stored in an authentication registry database prior to forwarding the subscriber authentication request message to the UDM function;
   receiving, by the proxy element, a subsequent update context request message from the AMF;
   updating the record entry to include an AMF identifier if the subscriber identifier and the PLMN identifier in the subsequent update context request message respectively match the subscriber identifier and the PLMN identifier in the record entry; and
   rejecting the subsequent update context request message if the subscriber identifier and the PLMN identifier in the subsequent update context request message fail to match the subscriber identifier and PLMN identifier in the record entry.

2. The method of claim 1 comprising resetting an authentication flag to zero after forwarding a subscriber authentication response message to the AMF.

3. The method of claim 1 comprising forwarding the update context request message to the UDM function and restarting a record expiry timer.

4. The method of claim 1 designating the subsequent update context request message as a suspicious message in response to rejecting the subsequent update context request message.

5. The method of claim 4 comprising forwarding the suspicious message to an analytics platform for message analysis.

6. The method of claim 1 wherein the proxy element is a security edge protection proxy (SEPP) or a service communication proxy (SCP).

7. The method of claim 1 comprising initiating a subsequent request timer in response to receiving a subscriber authentication response message that includes the subscriber identifier and the PLMN identifier from the UDM function.

8. A system for validating mobile subscriber entities against spoofing attacks in a communications network, the system comprising:
   a proxy element including at least one processor and a memory storing instructions; and
   a spoofing attack prevention manager that is implemented by the at least one processor to execute the instructions for: receiving a subscriber authentication request message that is sent from an access and mobility management function (AMF) and is directed to a unified data management (UDM) function in a home network, creating a record entry including a subscriber identifier and a public land mobile network (PLMN) identifier contained in the subscriber authentication request message, wherein the record entry is stored in an authentication registry database prior to forwarding the subscriber authentication request message to the UDM function, receiving a subsequent update context request message from the AMF, updating the record entry to include an AMF identifier if the subscriber identifier and the PLMN identifier in the subsequent update context request message respectively match the subscriber identifier and the PLMN identifier in the record entry, and rejecting the subsequent update context request message if the subscriber identifier and the PLMN identifier in the subsequent update context request message fail to match the subscriber identifier and PLMN identifier in the record entry.

9. The system of claim 8 wherein the proxy element is configured to reset an authentication flag to zero after forwarding a subscriber authentication response message to the AMF.

10. The system of claim 8 wherein the proxy element is configured to forward the update context request message to the UDM function and restart a record expiry timer.

11. The system of claim 8 wherein the proxy element is configured to designate the subsequent update context request message as a suspicious message in response to rejecting the subsequent update context request message.

12. The system of claim 11 wherein the suspicious message is forwarded to an analytics platform for message analysis.

13. The system of claim 8 wherein the proxy element is a security edge protection proxy (SEPP) or a service communication proxy (SCP).

14. The system of claim 8 wherein comprising initiating, by the proxy element, a subsequent request timer in response to receiving a subscriber authentication response message that includes the subscriber identifier and the PLMN identifier from the UDM.

15. One or more non-transitory computer readable media having stored thereon executable instructions that when executed by at least one processor of a computer cause the computer to perform steps comprising:
    receiving, by a proxy element, a subscriber authentication request message that is sent from an access and mobility management function (AMF) and is directed to a unified data management (UDM) function in a home network;
    creating, by the proxy element, a record entry including a subscriber identifier and a public land mobile network (PLMN) identifier contained in the subscriber authentication request message, wherein the record entry is stored in an authentication registry database prior to forwarding the subscriber authentication request message to the UDM function;
    receiving, by the proxy element, a subsequent update context request message from the AMF;
    updating the record entry to include an AMF identifier if the subscriber identifier and the PLMN identifier in the subsequent update context request message respectively match the subscriber identifier and the PLMN identifier in the record entry; and
    rejecting the subsequent update context request message if the subscriber identifier and the PLMN identifier in the subsequent update context request message fail to match the subscriber identifier and PLMN identifier in the record entry.

16. The one or more non-transitory computer readable media of claim 15 comprising resetting an authentication flag to zero after forwarding a subscriber authentication response message to the AMF.

17. The one or more non-transitory computer readable media of claim 15 comprising forwarding the update context response message to the AMF and restarting a record expiry timer.

18. The one or more non-transitory computer readable media of claim 15 designating the subsequent update context request message as a suspicious message in response to rejecting the subsequent update context request message.

19. The one or more non-transitory computer readable media of claim 15 wherein the proxy element is a security edge protection proxy (SEPP) or a service communication proxy (SCP).

20. The one or more non-transitory computer readable media of claim 15 comprising initiating a subsequent request timer in response to receiving a subscriber authentication response message that includes the subscriber identifier and the PLMN identifier from the UDM function.

* * * * *